United States Patent Office.

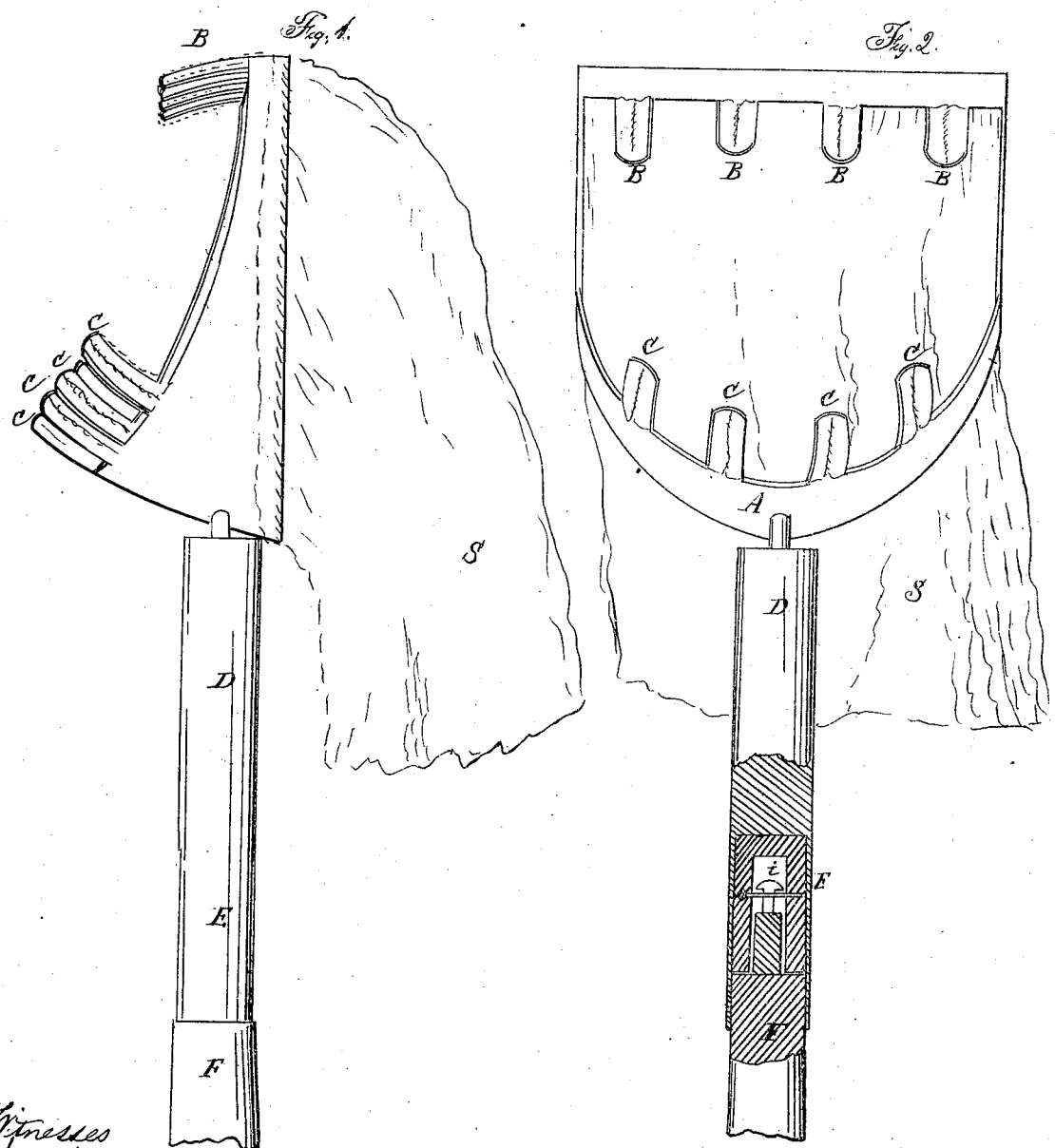

VIRGIL H. LYON, OF PLAINFIELD, INDIANA.

*Letters Patent No. 75,035, dated March 3, 1868.*

IMPROVEMENT IN FRUIT-GATHERER.

*The Schedule referred to in these Letters Patent and making part of the same.*

TO ALL WHOM IT MAY CONCERN:

Be it known that I, VIRGIL H. LYON, of Plainfield, in the county of Hendricks, and State of Indiana, have invented a new and useful Improved Fruit-Gatherer; and I do hereby declare that the following is a full, clear, and exact description thereof, reference being had to the accompanying drawing, making part of this specification.

My invention relates to form of the head, and fingers thereto attached, in that class of fruit-gatherers in which an open head, furnished with fingers, is employed to pull the fruit.

Figure 1 is a front view of the implement, and

Figure 2 is a side view of the same.

Similar letters of reference indicate corresponding parts in the several figures.

The following description will enable skilled artisans to make and use my invention:

The head, A, of the implement is made of sheet metal, in the form shown, being considerably wider from front to back at the bottom than the upper part. The top of the head is furnished with broad fingers, B, that are slightly curved downward toward their outer ends, and are set in a straight or only slightly curved line at the top, as being more certain and better adapted to take hold of the fruit, especially when hanging in clusters. The bottom part of the head projects forward, as shown, and is furnished with the fingers C, which, projecting still further forward and upward, in combination with the inclined bottom part of the head, provides a convenient and certain means of catching the fruit and conducting it to the sleeve or bag s, when loosened from the tree by either the fingers B or C. The position of the fingers C provides, also, a convenient means of picking off such fruit as may hang against or too near a limb, or in other inconvenient position to be taken off by the fingers B. The fruit is taken off with the fingers B by pulling the implement downward, and with the fingers C by raising or pushing it upward. The inside of the head, and also the inside of the fingers B and C, are lined with any suitable soft material, to prevent bruising the fruit. The head is attached to a pole or handle, D, which is made in sections, of convenient length, so that it may be increased or diminished in length at pleasure. The joints of the pole are formed by ordinary ferrules, E F, as shown, but are secured together by means of a pin, $i$, fixed in the end of the lower section, and having a flattened head, to enter a slot cut longitudinally in the thin piece of metal, O, inserted near the end of the upper section, as shown in fig. 1. For convenience of separating and putting together the pole, the ferrules are marked to indicate when the pin-head is in the proper position to enter the slot in piece O, and also to show when it is turned across the slot, to prevent its being drawn out.

It is found, in practice, that much of the fruit hangs to the tree with considerable tenacity, in consequence of which it is liable to slip from the fingers when pulling it. To obviate this, I give the fingers a suitable curve, to hold the fruit, and thus its reception in the sack is made more certain.

The head, as here shown, is made of metal, but it may, of course, be made of wood or any other suitable material.

In order to facilitate handling the implement, and to prevent the fruit from being bruised by falling directly to the ground through the sack, I have furnished small hooks at the bottom of each section of the handle, and attached corresponding eyes to the sack, by which it may be looped to the handle at any section desired, thus placing the sack, at all times, within control of the operator, without his having to give it particular attention.

Having thus fully described my invention, what I claim, and desire to secure by Letters Patent, is—

The head A, fingers C C C C, B B B B, in combination with sack S, when formed, constructed, and arranged in the manner herein described, and for the purpose set forth.

2. I claim the sectional rod D, in combination with head A, when constructed and arranged substantially in the manner as herein shown, and for the purpose set forth.

VIRGIL H. LYON.

Witnesses:
O. F. MAYHEW,
G. M. LEVETTE.